United States Patent [19]

Mercier

[11] Patent Number: 4,858,487
[45] Date of Patent: Aug. 22, 1989

[54] DEVICE FOR TRANSMISSION OF MOVEMENT BY AN OUTSIDE GEARING

[75] Inventor: Jacques Mercier, Paris, France

[73] Assignee: Regie Nationale des Usines Renault, Boulogne-Billancourt, France

[21] Appl. No.: 146,194

[22] Filed: Jan. 20, 1988

[30] Foreign Application Priority Data

Jan. 20, 1987 [FR] France .................. 8700558

[51] Int. Cl.$^4$ .............................................. F16H 1/08
[52] U.S. Cl. .................................. 74/424.7; 74/414; 74/458
[58] Field of Search ............... 74/424.5, 424.7, 458, 74/413, 414; 418/201 R

[56] References Cited

U.S. PATENT DOCUMENTS

| 2,683,994 | 7/1954 | Whitfield | 74/395 |
| 2,931,308 | 4/1960 | Luthi | 103/128 |
| 3,170,566 | 2/1965 | Zimmermann | 198/213 |
| 3,247,736 | 4/1966 | Roth | 74/462 |
| 3,288,077 | 11/1966 | Meskat | 103/128 |

Primary Examiner—Allan D. Herrmann
Assistant Examiner—Janice Chartoff
Attorney, Agent, or Firm—Oblon, Spivak, McClelland, Maier & Neustadt

[57] ABSTRACT

Device for constant velocity transmission of movement between two parallel shafts with axes of rotation (16) and (17) connected by an outside gearing. The pinion (14) and the pinion (15) of the outside gearing are helical with a helix having the same angle and the same direction, so that a pinion (14) and the pinion (15) rotate in the same direction.

7 Claims, 4 Drawing Sheets

DEVICE FOR TRANSMISSION OF MOVEMENT BY AN OUTSIDE GEARING

BACKGROUND OF THE INVENTION

1. Field of the Invention

This invention relates to a constant velocity transmission element connecting two parallel shafts rotating in the same direction in a continuous and reversible manner, capable of a high capacity of torque and speed.

2. Background of the Related Art

Currently, to do this in a known manner, flat or trapezoidal belts, toothed or not, or chains are used, these elements working with specially arranged pulleys.

These transmissions, in addition to their bulk, exhibit the drawback of a generally noisy operation, are limited in torque and speed, of an often high cost when a satisfactory endurance is desired. Finally, they do not exhibit constant velocity characteristics.

SUMMARY OF THE INVENTION

The object of the invention is to respond to these criticisms by the creation of a new element: an outside gearing each of whose pinions rotates in the same direction.

For this purpose, the invention proposes a device for transmission of movement between two parallel shafts connected by an outside gearing. The pinions of said outside gearing are helical and are identical, i.e., they have the same number of teeth with a helix having the same angle and the same direction, so that the pinions rotate with the same velocity and in the same direction.

The device for transmission of movement according to the invention makes it possible to obtain a very quiet operation that can absorb a relatively great torque while having performance with correct timing.

BRIEF DESCRIPTION OF THE DRAWINGS

Other characteristics and advantages of this invention will come out from the description of the following embodiment given by way of example with reference to the accompanying drawings in which.

DETAILED DESCRIPTION OF THE PREFERRED EMBODIMENTS

By way of nonlimiting example, a gearing will be described whose rotational speeds are equal, the modification for a gearing of a different ratio from that illustrated being performed without difficulty and remaining in the scope of the invention.

Figure 1:
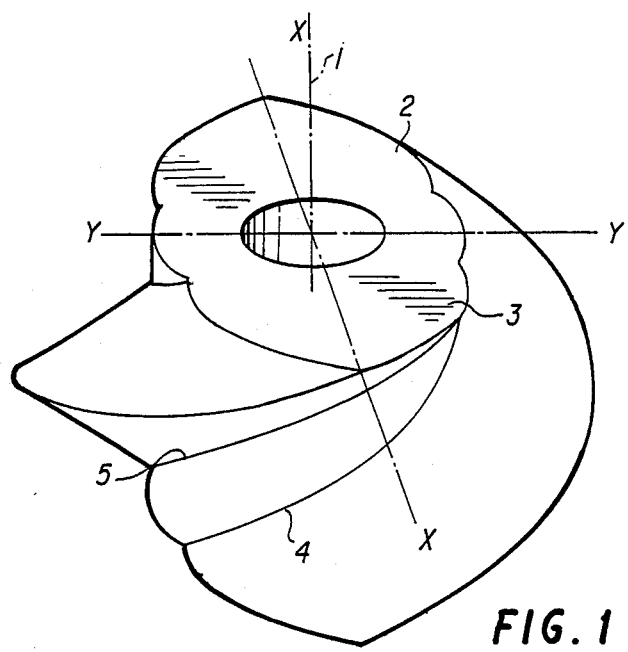
FIG. 1 is a view in perspective of a pinion according to the invention.

FIG. 1 shows a view in perspective of a pinion with axis 1 having two teeth 2 and 3 which are axially opposed and identical, placed longitudinally along two helices 4 and 5, each spaced by a half-turn.

Figure 2:
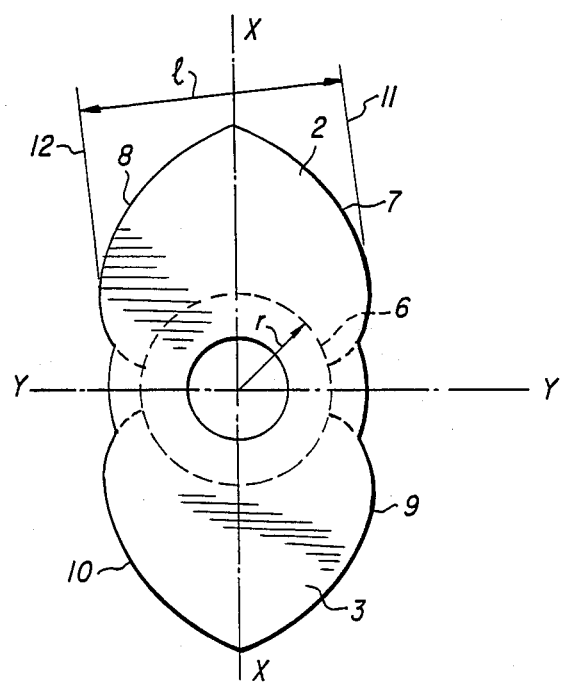
FIG. 2 is a plan view of the pinion of FIG. 1.

FIG. 2 is a plan view seen along axis 1 showing base circle 6 of radius r and the surfaces 7 and 8 of tooth 2, and 9 and 10 of tooth 3, involute to a circle and respectively symmetrical in relation to axis XX. Each tooth has constant width l defined by the distance between two parallel tangents 11 and 12 to surfaces 7 and 8, these tangents being perpendicular to a tangent to base circle 6. In the section plane, tooth 3 is symmetrical with tooth 2 in relation to axis YY perpendicular to axis XX.

Figure 3A:
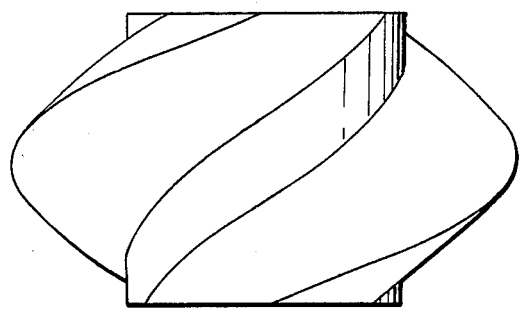
FIG. 3A is an elevation view along axis X—X of FIG. 1.
Figure 3B:
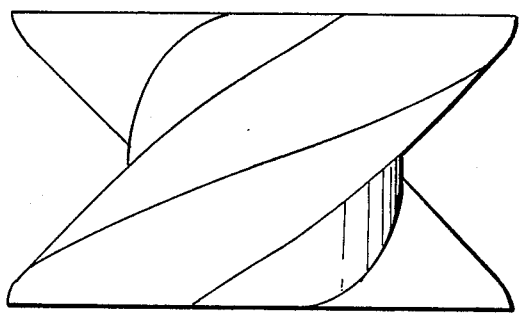
FIG. 3 an elevation view along axis Y—Y of FIG. 1.

FIGS. 3A and 3B show the pinion of FIG. 1 in elevation, as viewed along direction XX and in direction YY of FIG. 1, respectively.

Figure 4:
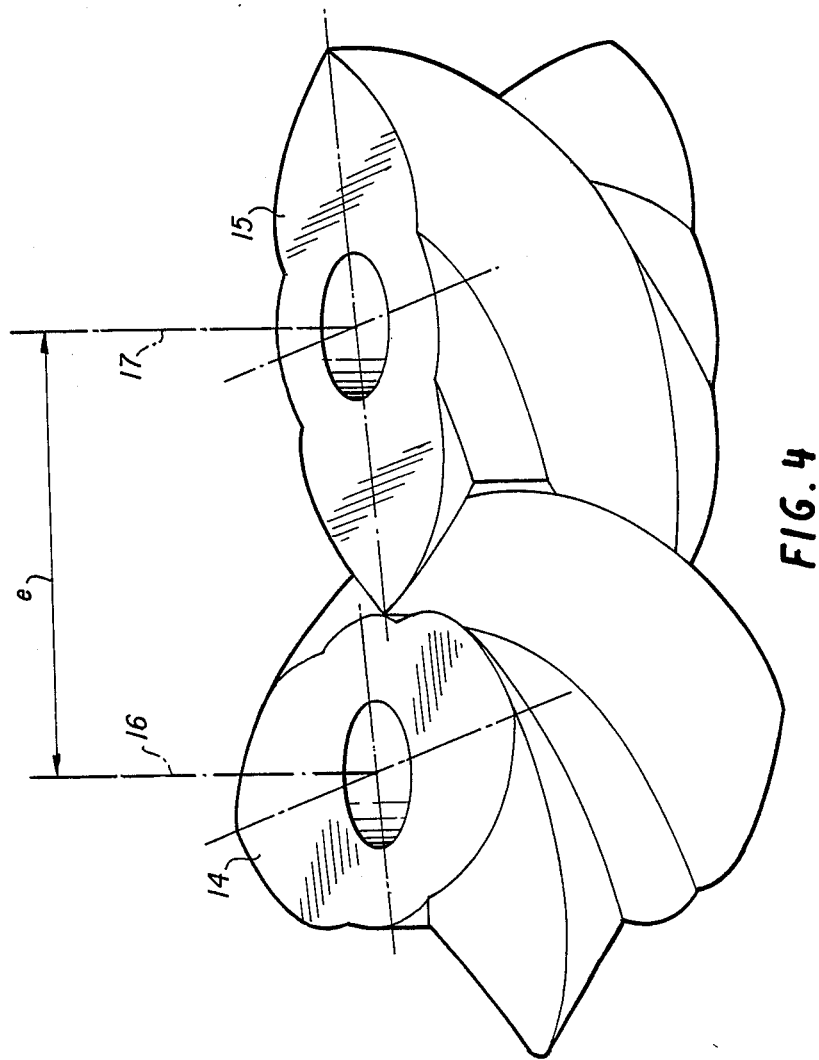
FIG. 4 is a view in perspective of a pair of gears corresponding to FIG. 1.

FIG. 4 is a view in perspective of a gearing having two identical pinions 14 and 15 rotating respectively around parallel axes 16 and 17, these axes being spaced by center distance e.

Figure 5:
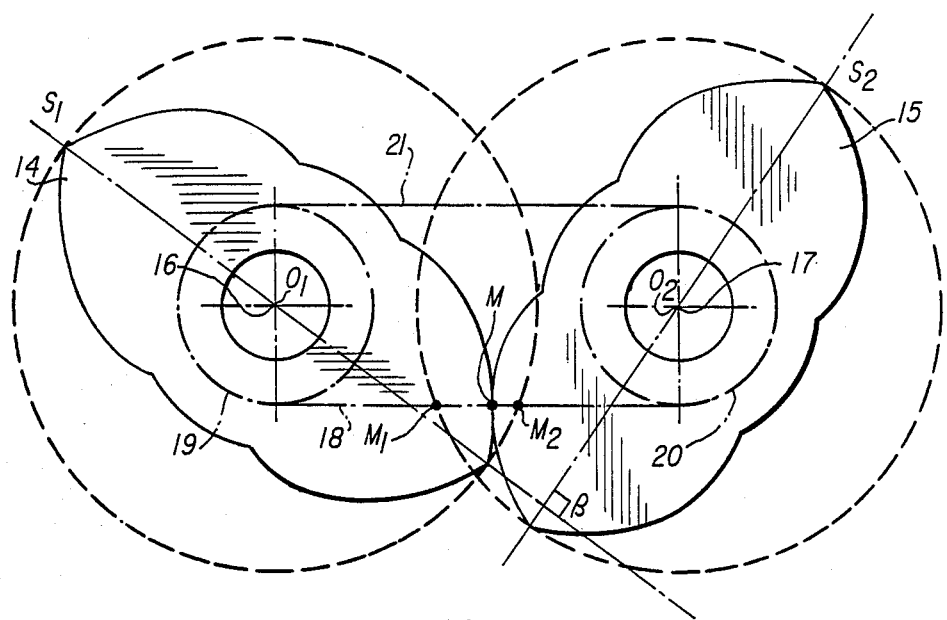
FIG. 5 is a plan view of the gearing of FIG. 4.

FIG. 5 is a plan view perpendicular to axes 16 and 17 showing the paired shapes of the teeth in mesh position. Axes $O_1S_1$ and $O_2S_2$ of the teeth, between them, form angle $\alpha = \pi/2$. The contact takes place at a point M located on common outside tangent 18 to the two identical base circles 19 and 20. This contact is located between points $M_1$ and $M_2$, which are the intersections of common tangent 18 with circles defined by the rotation of axes $O_1S_1$ and $O_2S_2$ passing through the tips of the teeth.

Figure 6:
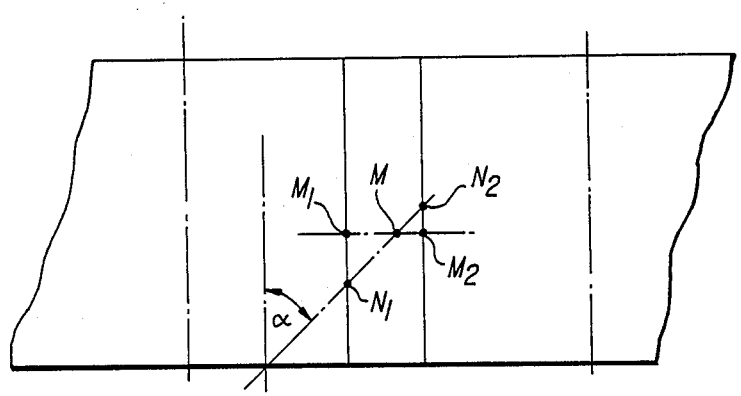
FIG. 6 is an elevational view of the meshing gears in FIG. 5.

FIG. 6 is a representative section showing the point of tooth contact, and is taken in a plane including the common tangent 18 of FIG. 5. The contact is linear and inclined along angle $\alpha$ which is the angle of the base helix. This contact is between points $N_1$ and $N_2$ located on the lines parallel to the axes passing through points $M_1$ and $M_2$. The condition $\beta = \pi/2$ assures the simultaneous contact of the sides of inions 14 and 15 in the outside plane tangent to the two base cylinders, this tangent plane corresponding to common tangent 21.

This description, given by way of example, does not exclude the possibility of any number of teeth, or of the nonidentity of the two pinions, a nonidentity resulting from the habitual toothing corrections used for the shape from an involute to a circle.

The following points which are characteristics of the invention result from the preceding description:

As a first characteristic, the gearing is composed of two identical pinions (the same part twice) each having n teeth with a shape with an involute to a circle in a plane perpendicular to its axis. The teeth are placed longitudinally in a helix at approximately at least 1/n turn.

As a second characteristic, the pinions can receive toothing corrections.

As a third characteristic, the helices of the two pinions have the same direction.

As a fourth characteristic, the gearing is a constant velocity gearing, there is not variation in the transmission ratio in operation and regardless of the center distance even if this latter is different from the theoretical center distance.

As a fifth characteristic, the axes of symmetry of the teeth in contact in a plane perpendicular to the axes of rotation, in operation, form a constant angle $\beta$, a function of the number of teeth is such that $\beta = \pi \times n - 1/n$..

As a sixth characteristic, width l of a tooth is related to center distance e and to radius r of the base circles by the relation: $l = e - \pi \times n - 1/n \times r$.

As a seventh characteristic, the ratio of centerline distance e to radius r of the base circle is a function of the number of teeth n. It is necessary to have $e/2r > \tan \beta/2$, angle $\beta$ being that previously defined by $\beta = \pi \times n - 1/n$.

As an eighth characteristic, the meshing takes place for paired sides in a given position along a straight portion located in the outside plane tangent to the two base cylinders and inclined along angle α on the base helix.

As a ninth characteristic, the length c of path of contact of the pinion surfaces is defined by the relation $$\tan\left(\frac{c}{2r} + \pi \cdot \frac{n-1}{2n}\right) = \frac{e}{2r} + \frac{c}{2r},$$

c being this length of path of contact, n being the number of teeth, e being the distance between the centers of rotation and r being the radius of the base circle.

As a tenth characteristic, the bulky shape of the teeth prevents the truncation of the tops of teeth, which makes it possible to have the maximum path of contact for a given shape.

As an eleventh characteristic, the cutting, finishing and inspection of these gearings are subject to the same techniques as those used for the standard gearings with an involute of a circle (in particular cutting by gear hobbing).

The invention also covers, in addition to the gearing itself, all applications using one or more of the characteristics of the gearing, when alone or in combination with standard gearings in any field whatsoever.

Obviously, numerous modifications and variations of the present invention are possible in light of the above teachings. It is therefore to be understood that within the scope of the appended claims, the invention may be practiced otherwise than as specifically

I claim:

1. A device for the transmission of movement between a pair of identical pinions, one of said pinions being mounted on each of two parallel rotational axes, each of said pinions having outside gearing, said outside gearing of said pinions being mutually meshing and each comprising identical helixes, whereby the pinions rotate at the same velocity and in the same direction, wherein the shape of said teeth in a plane perpendicular to axes of said pinion is an involute to a base circle.

2. The device of claim wherein each said tooth is on a helix having a length of at least 1/n turns, where is a number of teeth.

3. The device of claim 1 wherein an intersection of axes of symmetry of said teeth of meshing pinions as seen in a plane perpendicular to said rotational axes of said teeth form an angle $$\beta = \pi \cdot \frac{n-1}{n},$$

where n is a number of teeth.

4. The device of claim 1 wherein a width l of each of said teeth is $$l = e - \pi \cdot \frac{n-1}{n} \cdot r,$$

wherein e is a spacing between said rotational axes of said pinions, n is a number of teeth and r is a diameter of said base circle.

5. The device of claim 3 wherein:

$$\frac{e}{2r} > \tan\frac{\beta}{2},$$

where e is a spacing between said rotational axes of said pinions and f is a diameter of said base circle.

6. The device of claim 1 wherein:

$$\tan\left(\frac{c}{2r} + \pi \cdot \frac{n-1}{2n}\right) = \frac{e}{2r} + \frac{c}{2r},$$

where e is a spacing between said rotational axes of said pinions, r is a diameter of said base circle, and c is a length of a path of contact of meshing teeth.

7. The device of claim 1 wherein said outside gearing of said pinions mesh along a straight portion located in an outside plane tangent to said base circles of said pinions and inclined along an angle α on said helix.

* * * * *